United States Patent
Knas et al.

(10) Patent No.: US 10,432,781 B1
(45) Date of Patent: *Oct. 1, 2019

(54) SYSTEMS AND METHODS FOR PRESENTING CONTENT BASED ON USER BEHAVIOR

(71) Applicant: MASSACHUSETTS MUTUAL LIFE INSURANCE COMPANY, Springfield, MA (US)

(72) Inventors: Michal Knas, Monson, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,467

(22) Filed: Jun. 28, 2018

Related U.S. Application Data

(63) Continuation of application No. 15/466,510, filed on Mar. 22, 2017, now Pat. No. 10,051,113, and a
(Continued)

(51) Int. Cl.
*H04W 4/70* (2018.01)
*H04M 1/725* (2006.01)
(Continued)

(52) U.S. Cl.
CPC ... *H04M 1/72577* (2013.01); *H04M 1/72569* (2013.01); *H04W 4/027* (2013.01);
(Continued)

(58) Field of Classification Search
CPC ..... H04W 4/026; H04W 4/027; H04W 4/028; H04W 4/04; H04W 52/0254; H04W 4/18;
(Continued)

(56) References Cited

U.S. PATENT DOCUMENTS

| 7,786,975 B2 | 8/2010 | Ording et al. |
| 2002/0115436 A1* | 8/2002 | Howell ................. B60R 25/102 455/426.1 |

(Continued)

OTHER PUBLICATIONS

Oscar de Brujin et al., "Rapid Serial Visual Presentation: A space-time trade-off in information presentation", Imperial College of Science, Technology & Medicine. Department of Electrical and Electronic Engineering, 2000.

*Primary Examiner* — Jean A Gelin
(74) *Attorney, Agent, or Firm* — Eric L. Sophir; Dentons US LLP

(57) ABSTRACT

Systems and methods for controlling content displayed on a user device, including the steps of by a processing content data configured for presentation on a display of the user device, transmitting the content data to one of the display, speaker, or both, collecting behavior data of the head of the user by the tracking sensor, determining, by that the user is viewing the display based on the head position and/or the amount of the head captured by the sensor. When the viewer is viewing the display generating, by the processing module of the user device, a change in the content data presented on at least one of the display, speaker, or both, and when the viewer is not viewing the display presenting, by the processing module of the user computing device, the same content data on at least one of least one of the display, speaker, or both.

20 Claims, 8 Drawing Sheets

Related U.S. Application Data continuation of application No. 15/466,757, filed on Mar. 22, 2017, now Pat. No. 10,178,222.

(60) Provisional application No. 62/311,644, filed on Mar. 22, 2016, provisional application No. 62/311,461, filed on Mar. 22, 2016.

(51) Int. Cl.
  *H04W 4/02* (2018.01)
  *H04W 84/12* (2009.01)
  *H04W 4/80* (2018.01)

(52) U.S. Cl.
  CPC ............... *H04W 4/70* (2018.02); *H04W 4/80* (2018.02); *H04W 84/12* (2013.01)

(58) Field of Classification Search
  CPC ... H04W 24/10; H04W 4/046; H04W 64/006; H04M 1/72569; H04M 2250/10; H04M 2250/12
  See application file for complete search history.

(56) References Cited

U.S. PATENT DOCUMENTS

| | | | |
|---|---|---|---|
| 2003/0236622 A1* | 12/2003 | Schofield | G01C 21/00 340/995.28 |
| 2005/0088291 A1* | 4/2005 | Blanco | G07C 5/0891 340/441 |
| 2007/0006098 A1 | 1/2007 | Krumm et al. | |
| 2009/0221279 A1 | 9/2009 | Rutledge | |
| 2010/0161409 A1 | 6/2010 | Ryu et al. | |
| 2011/0093159 A1* | 4/2011 | Boling | G06Q 10/06 701/29.6 |
| 2012/0256967 A1 | 10/2012 | Baldwin et al. | |
| 2012/0265977 A1 | 10/2012 | Ewell, Jr. et al. | |
| 2013/0040600 A1* | 2/2013 | Reitnour | H04W 4/90 455/404.2 |
| 2013/0063304 A1* | 3/2013 | O'Regan | G01S 5/0027 342/357.55 |
| 2013/0150004 A1* | 6/2013 | Rosen | H04W 8/22 455/414.1 |
| 2014/0019167 A1 | 1/2014 | Cheng et al. | |
| 2014/0045477 A1 | 2/2014 | Ewell, Jr. et al. | |
| 2014/0118140 A1* | 5/2014 | Amis | G08B 25/08 340/539.13 |
| 2014/0210863 A1 | 7/2014 | Osaka | |
| 2014/0359647 A1 | 12/2014 | Shoemake et al. | |
| 2015/0086072 A1 | 3/2015 | Kompalli et al. | |
| 2015/0099480 A1 | 4/2015 | Reiter | |
| 2015/0205494 A1 | 7/2015 | Scott | |
| 2015/0234457 A1 | 8/2015 | Kempinski | |
| 2015/0245084 A1 | 8/2015 | Downing et al. | |
| 2015/0347903 A1 | 12/2015 | Saxena et al. | |
| 2015/0370435 A1 | 12/2015 | Kirmse et al. | |
| 2016/0132530 A1 | 5/2016 | Misu et al. | |
| 2016/0162478 A1 | 6/2016 | Blassin et al. | |
| 2016/0189423 A1 | 6/2016 | Kaeser et al. | |
| 2016/0225012 A1 | 8/2016 | Ha et al. | |
| 2017/0039784 A1* | 2/2017 | Gelbart | G06Q 30/0206 |
| 2017/0188168 A1 | 6/2017 | Lyren et al. | |
| 2017/0210288 A1 | 7/2017 | Briggs et al. | |

\* cited by examiner

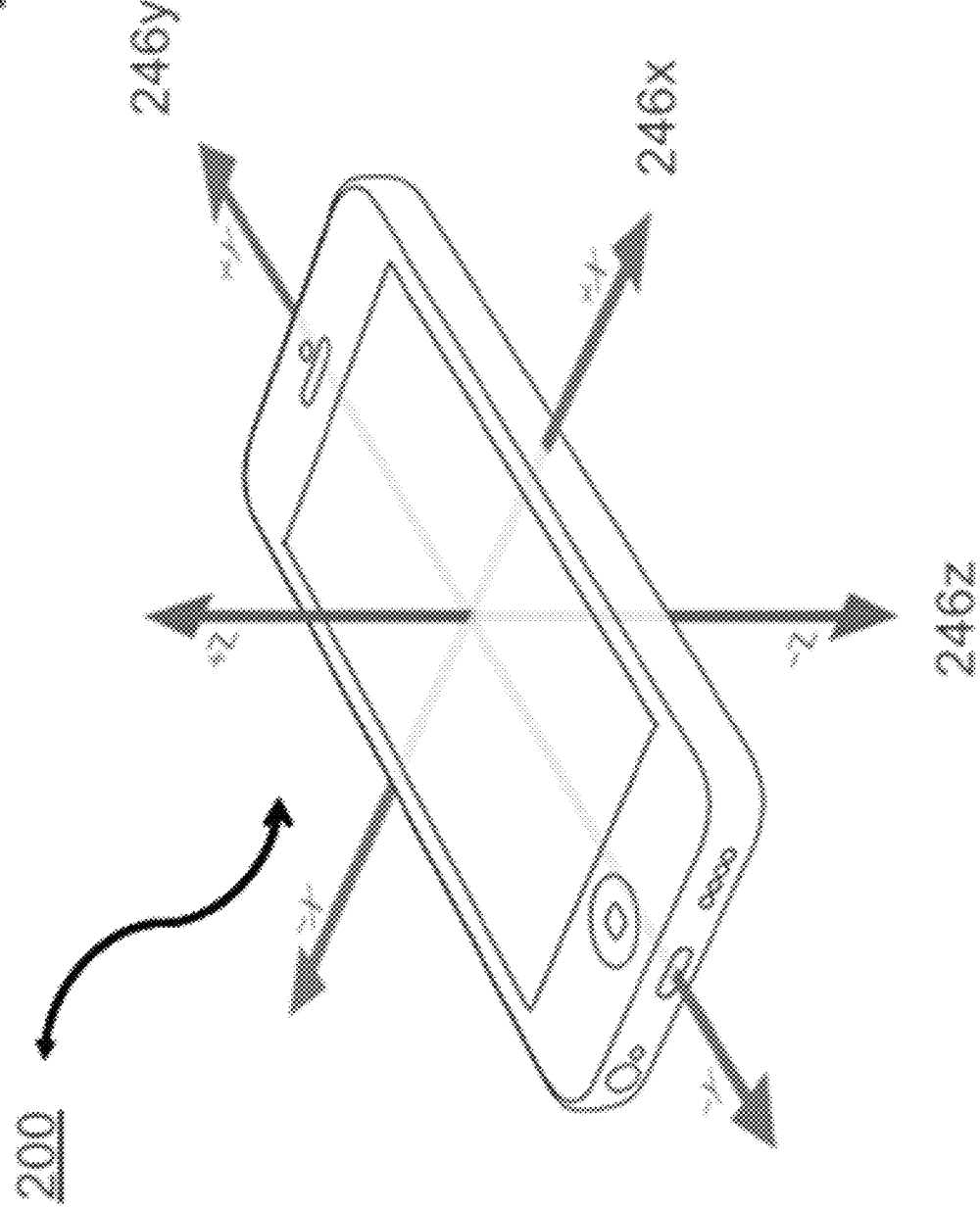

SYSTEMS AND METHODS FOR PRESENTING CONTENT BASED ON USER BEHAVIOR

CROSS-REFERENCE TO RELATED APPLICATIONS

This application is a continuation application of U.S. patent application Ser. No. 15/466,510, filed on Mar. 22, 2017, which claims the benefit of U.S. Provisional Application No. 62/311,644, filed on Mar. 22, 2016, each of which is incorporated by reference herein in their entirety.

This application is a continuation application of U.S. patent application Ser. No. 15/466,757, filed on Mar. 22, 2017, which claims the benefit of U.S. Provisional Application No. 62/311,461, filed on Mar. 22, 2016, each of which is incorporated by reference herein in their entirety.

This application is related to U.S. patent application Ser. No. 15/466,617, filed Mar. 22, 2017; U.S. patent application Ser. No. 15/466,410, filed Mar. 22, 2017; U.S. patent application Ser. No. 15/466,445, filed Mar. 22, 2017; and U.S. patent application Ser. No. 15/466,757, filed Mar. 22, 2017, all of which are incorporated by reference in their entirety.

FIELD OF THE DISCLOSURE

The present disclosure relates in general to systems and methods for dynamically presenting content based on sensed movements.

BACKGROUND

People consume an ever increasing amount of text and other media daily in different environments and various modes including mobile devices such as mobile phones and tablets. The popularity of mobile devices has had some unintended and dangerous consequences when mobile devices are used to consume content by a user that is operating a vehicle. Distracted driving, the term used for driving while engaged in other activities such as texting, talking on the phone, watching media, using a navigation system, reading content is estimated to increase the risk of getting into a crash by as much as three times. As such, numerous efforts have been undertaken to reduce distracted driving and improve highway safety, like adopting laws banning cell phone use while operating a vehicle, employing the use of hands-free aids and using software or connecting devices to vehicle onboard diagnostics to prevent device use while a vehicle is in motion.

Though these and other efforts have attempted to reduce instances of distracted driving, many people, especially young drivers, still continue to engage in distracted driving behaviors. Additionally, some of these techniques are problematic because the voice recognition software used in a hands-free aid may not be very good, resulting in greater distraction of the user when the device doesn't recognize a command or executes an improper command. Additionally when software or onboard diagnostics are used to shut off a device completely, a user is prevented from using aids in the mobile device such as GPS or playing podcasts, audio, music and the like through a mobile device. As such, there is a continuing need to develop techniques to control displayed content on mobile devices, especially when mobile devices are used while operating a vehicle.

SUMMARY

The systems and methods disclosed herein attempt to address the problems associated with the conventional technology used to reduce and/or eliminate distracted driving associated with the use of devices by providing a mechanism to change the display of a device used in a vehicle based on head detection and movement.

Disclosed herein are systems and methods for controlling content and/or sound provided to a user. In an embodiment the method includes generating, by a processing module of a mobile user computing device, content data configured for presentation on at least one of a display and a speaker of the mobile user computing device; transmitting, by the processing module of the mobile user computing device, the content data to one of the display of the mobile user computing device, the speaker of the mobile user computing device for audio transmission, or both; dynamically monitoring an effective speed of travel of the mobile user computer device by determining via a GPS system a change in location of the mobile user computing device at regular intervals; when the effective speed of the mobile user computing device exceeds a predetermined velocity, continuously collecting, by a tracking sensor, at least one of an acceleration data of the mobile user computer device and a behavior data of a user; dynamically determining, by the processing module of the mobile user computing device, whether at least one of the acceleration data or behavior data represents a value that satisfies a predetermined threshold value; automatically generating, by the processing module of the mobile user computing device, a change in the content data presented on at least one of the display of the mobile user computing device, the speaker of the mobile user computing device, or both, only when the value satisfies the threshold and automatically resuming to present, by the processing module of the mobile user computing device, unchanged content data configured for presentation on at least one of the display of the mobile user computing device, the speaker of the mobile user computing device, or both, when the value no longer satisfies the threshold value.

In an embodiment, collecting behavior data comprises automatically extracting behavior data from the user via a head-tracking sensor that extracts information about when a user's head movement is within a boundary associated with one or more portions of the display in a direction of the mobile user computing device and times a duration of said user's head movement within said boundary, and the threshold value relates to the timed duration and is about 1 second, 2 seconds, 3 seconds, or 4 seconds. In an embodiment, the method may include reflecting a light on the user's head or offsetting an illumination source from a marker on the user's head.

In an embodiment, collecting behavior data includes automatically extracting behavior data from the user via an eye tracking sensor that extracts information about when a user's eye movement is within a boundary associated with one or more portions of the display of the mobile user computing device and times a duration of said user's eye movement within said boundary, and the threshold value relates to the timed duration and is about 500 ms, 1 second, 2 seconds, 3 seconds, 4 seconds or 5 seconds.

In an embodiment, the tracking sensor is an accelerometer that extracts information about changes in acceleration of the mobile user computer device and times a duration of said changes in acceleration and the threshold value relates to the timed duration and is about 1, second, 2 seconds, 3 seconds, or 4 seconds.

In an embodiment, the change in the content data comprises one of pausing the content data, stopping the content data, or replacing the content data.

In an embodiment, the change in the content data comprises displaying a blank display or a predetermined message on the display.

In another embodiment, the tracking of behavior data includes one of reflecting a light on the user's head or offsetting an illumination source from a marker on the user's head.

In another embodiment, the tracking sensor is an accelerometer that extracts information about an acceleration of the mobile user computer device and duration of the acceleration and the threshold value is about 1 second, 2 seconds, 3 seconds, or 4 seconds.

In another embodiment, a system for managing content/ and or audio displayed to a user includes a mobile user computing device having a processing module; a tracking sensor communicatively coupled to the processing module and configured to continuously collect at least one of an acceleration data of the mobile user computing device and a behavior data of a user when activated and to communicate to the processing module the collected data; a GPS system communicatively coupled to the processing module; and at least one of a display and a speaker; wherein the processing module is configured to (i) dynamically monitor a speed of travel of the mobile user computer device via the GPS system, (ii) automatically activate the tracking sensor when the speed of travel is greater than a predetermined velocity, (iii) generate content data for presentation on the display, the speaker, or both, (iv) dynamically determine whether at least one of the collected acceleration data and behavior data represents a value that satisfies a threshold value, (v) automatically generate a change in the content data when the value satisfies the threshold value, and (vi) automatically resume presentation of the content data unchanged when the value does not satisfy the threshold value.

In an embodiment, the mobile user computing device also includes at least one accelerometer.

In an embodiment, the mobile user computing device also includes at least three accelerometers, the three accelerometers configured to measure the acceleration of the mobile user computing device along an x, y, and z orthogonal axes in a physical space.

In an embodiment, the tracking sensor includes at least one of an eye-tracking sensor, a head tracking sensor, and an accelerometer.

In an embodiment, the tracking sensor includes optical tracking device, a camera, an infrared emitter, or an ocular sensor.

Numerous other aspects, features and benefits of the present disclosure may be made apparent from the following detailed description taken together with the drawing figures.

BRIEF DESCRIPTION OF THE DRAWINGS

The present disclosure is here described with reference to embodiments illustrated in the drawings. Other embodiments may be used and/or other changes may be made without departing from the spirit or scope of the present disclosure. The illustrative embodiments described in the brief description are not meant to be limiting of the subject matter presented here.

FIG. 2B illustrates an exemplary embodiment of a smart phone and the three axes along which the accelerometers monitor acceleration data.

DETAILED DESCRIPTION

Figure 1:
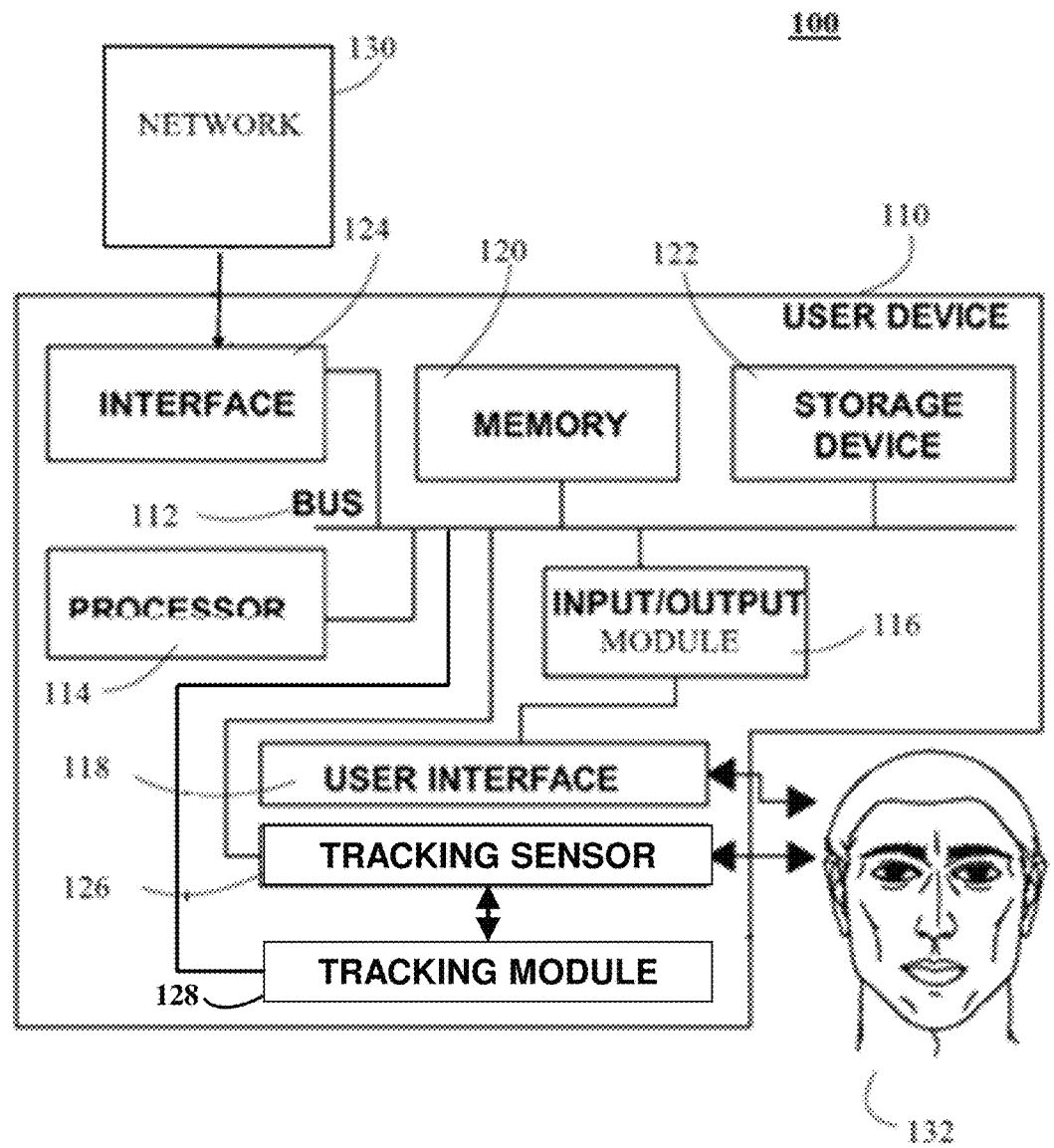
FIG. 1 illustrates a functional block diagram of a system architecture for presenting content, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Systems and methods for controlling content display are disclosed. The methods may include receiving user input on a device from a user to control presentation of content to the user. The method may include detecting the user, monitoring the user's movement in relation to device, and generating feedback data. The method may include providing the feedback data to the device and changing the content displayed to the user.

The disclosed methods may be implemented by users in interaction with computer systems. In one or more embodiments, the computer systems may include a control device and a content device including a tracking sensor, where the computing devices may communicate using any network infrastructure. Examples of computing devices may include personal computers, tablet devices, and mobile phones, vehicle navigation systems, amongst others. Examples of network infrastructures may include intranets, local area networks (LAN), virtual private networks (VPN), wireless area networks (WAN) and the world wide web, amongst others.

FIG. 1 is a functional block diagram illustrating a system architecture for presenting and managing content presentation to a device user, according to an embodiment. In FIG. 1, the system architecture includes a user device 110, such as a mobile phone or smart phone, tablet, personal digital assistant (PDA), laptop, or other mobile device that includes one or more sensors. The system includes a device 110 and user 132. In FIG. 1, device 110 further includes device bus 112, processor 114, input/output module 116, user interface 118, memory 120, storage device 122, user device interface 124, and a tracking sensor 126. In some embodiments, system hardware 100 can include additional, fewer, or differently arranged components than those illustrated in FIG. 1.

In an embodiment the sensor can include at least one of a head-tracking sensor, an ocular sensor, or an accelerometer 126. A device 200 as shown in FIG. 2A and discussed in more detail below typically includes other sensors for inputting information such as one or more gyroscopes 247 for detecting rotational movement, a magnetometer 243 for detecting magnetic fields (e.g., for the compass), light sensors 244 (e.g., for the camera), a system for detecting and processing GPS signals 248 (e.g., for determining location and direction of travel), a touch pad 245, and a microphone 242 for detecting sound.

Figure 2A:
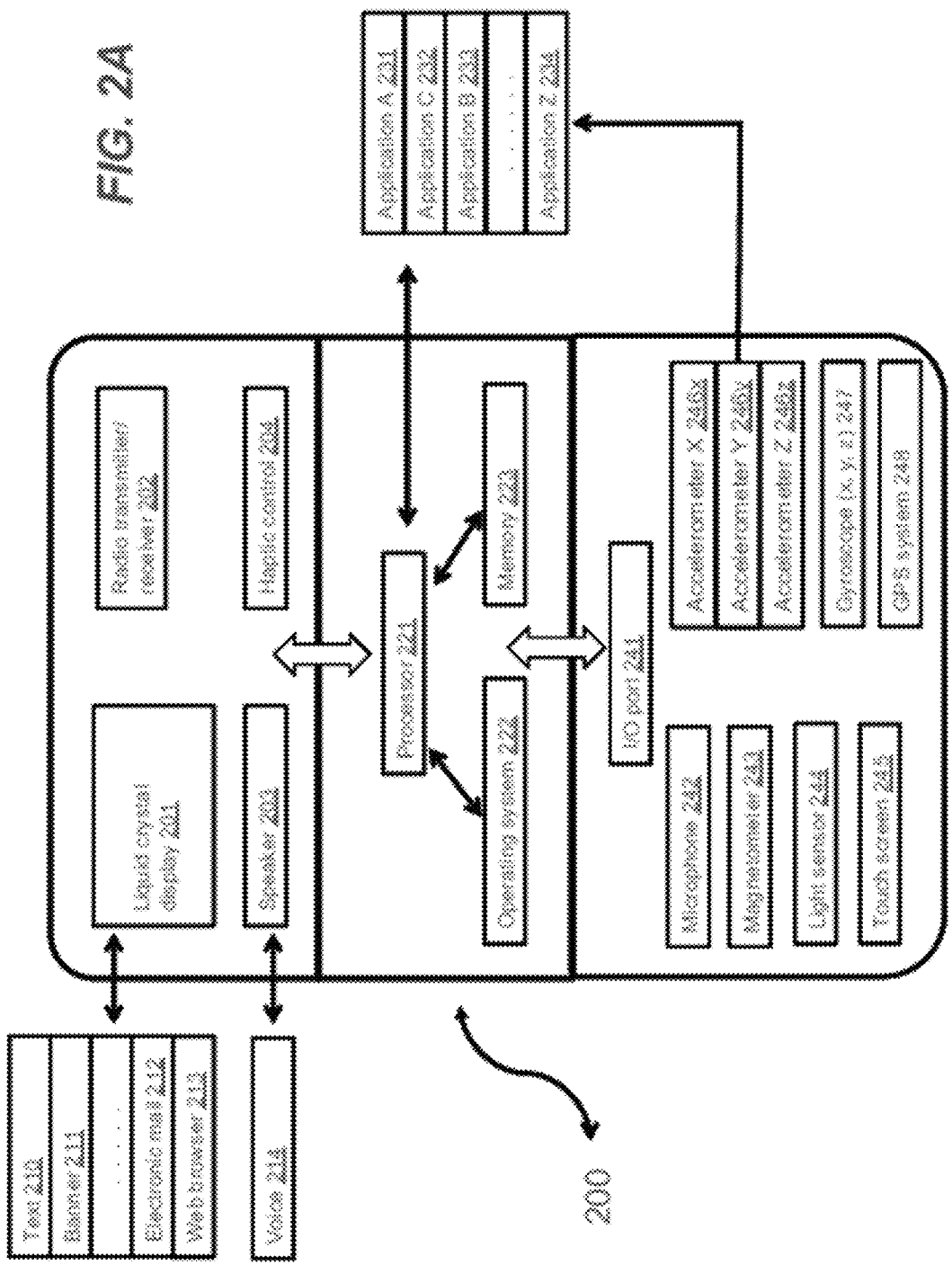
FIG. 2A illustrates a functional block diagram of a system architecture for presenting content, according to an exemplary embodiment.

The user device 200 as shown in FIG. 2A also includes bidirectional radio transmitter/receiver 202 that enables the smart phone to send and receive information wirelessly via a cell tower or wireless router to another device, server, or network (e.g., LAN, WAN, VPN, or WWW, among others). The user may use his or her user device 110 to communicate through any of a number of communication technologies, such as text 210 (e.g., SMS, MMS), a banner 211 on the liquid crystal display 201, electronic mail 212, web browsing 213, voice or voice mail 214, to name a few. In some cases, the software for operating these functions is installed on the user device 110; in other cases, software may be downloaded or modified by the user of the smart phone.

In particular, the user may personalize the functionality of his or her user device by downloading various mobile applications, e.g., 231, 232, 233, 234, such as mobile applications for banking, life or automobile insurance, podcasts, maps, cell phone or Internet service providers, or shopping networks, to name only a few. When a user downloads an application on the smart phone, it is integrated with the device's existing operating system 222 and other software to perform its intended operations, such as accepting input from the sensor, keypad, accessing the radio transmitter, transmitting and receiving information to and from the Internet, displaying text and video information on the liquid crystal display, providing audio, changing the audio, displayed text and/or video information, and performing other operations. Mobile applications, such as those for banks, insurance companies, Internet or cell phone providers, shopping, and other such applications, generally perform "push" and "pull" capabilities, where a "push" activity is an activity that "pushes" information to the user, e.g., sending a message to a mobile device and a "pull" activity is an action that "pulls" information from another source, e.g., sending a request or instructions, accessing account information associated with the mobile application or receiving a confirmation that instructions have been performed.

In FIG. 1, user device bus 112 is electronically coupled to and in bi-directional communication with processor 114, input/output module 116, memory 120, storage device 122, user device interface 118, tracking sensor 126 and network interface 124. In these embodiments, user interface 118 is rendered by input/output module 116. Further to these embodiments, user interface 118, and tracking sensor 126 are configured to interact with user 132 and receive behavioral information from the user 132. In these embodiments, user device bus 112 includes a path that allows components within user device 110 to communicate with each other.

In some embodiments, processor 114 is implemented as computing hardware component including a central processing unit able to carry out instructions to perform one or more instructions associated with user device 110. In these embodiments, processor 114 can include a microprocessor, an application specific integrated circuit (ASIC), a field programmable object array (FPOA), and the like. Further to these embodiments, processor 114 interprets and executes instructions retrieved from memory 120 and storage device 122.

In an example processor 114 is configured to interpret and execute instructions associated with the operation of user device communication module 112 (e.g., bus communication system for transferring data between components), input/output module 116, user interface 118, and tracking sensor 126. In these embodiments, processor 114 is implemented as any computing hardware component including a central processing unit able to execute instructions to perform one or more actions associated with implementing functionality and/or process instructions for execution on the user device 110. Still further to these embodiments, processor 114 can include a microprocessor, an application specific integrated circuit (ASIC), a field programmable object array (FPOA), and the like. In these embodiments, processor 114 interprets and executes instructions retrieved from memory 120 and/or storage device 122. In an example and referring to FIG. 1, processor 114 is configured to interpret and execute instructions associated with the operation of tracking sensor 126.

In some embodiments, input/output module 116 is implemented as a computer hardware component that includes peripherals and/or other mechanisms that may enable a user to input information to user device 110, including keyboards, computer mice, buttons, touch screens, voice recognition, biometric mechanisms, and the like. In these embodiments, input/output module 116 may be further configured to include one or more mechanisms for outputting information to user 132, such as, for example displays, light emitting diodes (LEDs), printers, speakers, and the like. Further to these embodiments, input/output module 116 is implemented to include a computer hardware component able to output data to user 132 via textual and/or graphical content, images, videos, audio, such as a podcast, and the like. In these embodiments, input/output module 116 is further configured to provide content by rendering the content onto user interface 118 and to receive input from user 132 via user interface 118.

In some embodiments, user interface 118 is implemented as a software module running on associated hardware configured to receive input from user 132, process the received input into input data, provide the input data to input/output module 116, receive content from input/output module 116, and display content to user 132. In these embodiments, input data includes user requests to display a desired set of content, user instructions to display supplemental content associated with the display of content, and the like.

In some embodiments memory 120 is implemented as a computing hardware component that allows the storage and manipulation of data during operations carried out by processor 114. In an example, memory 120 allows the storage and manipulation of data during operations associated with user device communication module 112, input/output module 116, user interface 118, tracking sensor 126, and tracking module 128. In these embodiments, memory 120 is implemented as computer hardware component that allows the storage and manipulation of data during operations carried out by processor 114. In an example, memory 120 allows the storage and manipulation of data during operations associated with tracking sensor 126, and/or input/output module 116. Examples of memory 120 include random access memory (RAM), Dynamic RAM (DRAM), Static RAM (SRAM) read-only memory (ROM), flash memory, and the like.

In some embodiments, storage device 122 is implemented as a computer hardware component that allows the storage and retrieval of data associated with running one or more modules and executable versions of the one or more modules and is configured to store information and instructions for execution by processor 114 to control the associated componentry within user device 110. In an example storage device 122 is implemented to store and retrieve data associated with one or more of input/output module 116, user interface 118, and tracking sensor 126, for execution by processor 114 to control the associated componentry within system hardware 100. In these embodiments, storage device 122 is implemented as a computer hardware component that allows the storage and retrieval of data associated with running one or more modules and executable versions of the one or more modules and is configured to store information and instructions for execution by processor 114 to control the associated componentry within server 100. Examples of storage device 122 include magnetic and/or optical recording media, ferro-electric RAM (F-RAM) hard disks, solid-state drives, floppy disks, optical discs, Electrically Programmable Memories (EPROMs), Electrically Erasable and Programmable Memories (EEPROMS) and the like.

In other embodiments, user device interface 124 is implemented as a computer hardware components configured to allow user device 110 to communicate with other computing devices and/or systems through network connections. Examples of network connections include any suitable connections between computers, such as, for example intranets, local area networks (LANs), virtual private networks (VPNs), wide area networks (WANs), the Internet, and the like. User device interface 124 can be implemented as any suitable interface, such as, network interface controllers, wireless network interface controllers, and the like.

Figure 3:
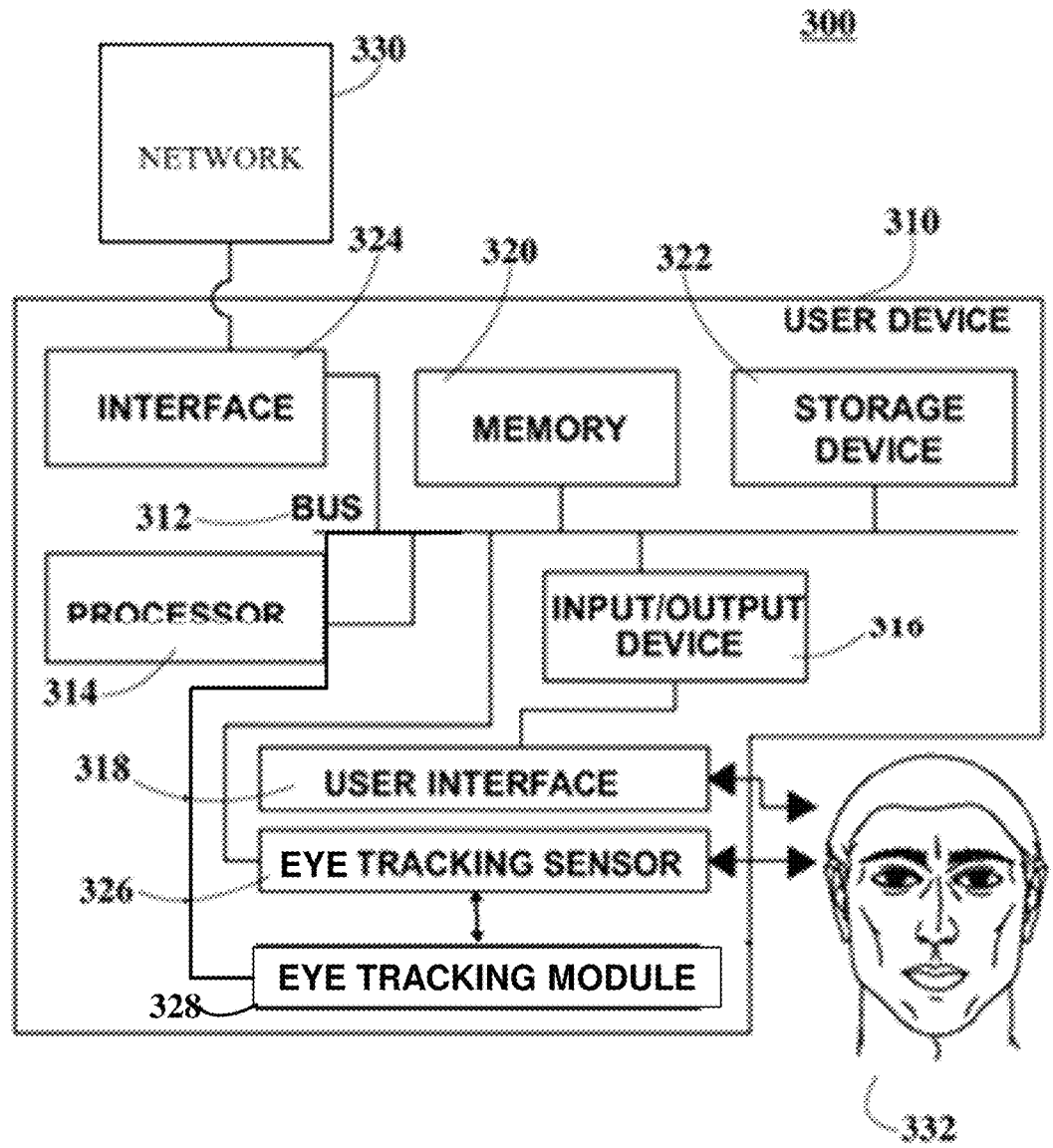
FIG. 3 illustrates a functional block diagram of a system architecture for presenting content, according to an exemplary embodiment.

In some embodiments, tracking module 128 is an eye tracking module that is implemented as a software module running on associated hardware, configured to receive command data from processor 114, process the command data into hardware operation data, and provide the hardware operation data to eye-tracking sensor module 128. In an example and as shown in FIG. 3, in these embodiments, a user device 310 tracks eye movement using an eye-tracking module 328 configured to receive ocular sensor data from eye-tracking sensor 326, process the ocular sensor data to generate ocular engagement data, and provide the ocular engagement data to processor 314 for analyzing the content. Further to these embodiments, ocular engagement data includes one or more metrics characterizing the level of engagement of user 332 with content being displayed via user interface 318. In an example, the ocular engagement data includes data describing whether or not the gaze of user 332 is directed toward the content displayed via user interface 318, a general level of interest in the content displayed via user interface 318 as determined by the eye movements of user 332, and the like. In these embodiments, hardware operation data includes instructions for hardware operation, such as instructions to activate eye-tracking sensors, to begin to track the gaze of user 332, to stop tracking the gaze of user 332, and the like.

In some embodiments, as shown in FIG. 3, eye tracking sensor 326 is communicatively coupled to an eye tracking module 328. The eye tracking sensor 326 comprises software configured to control associated hardware and configured to receive hardware operation data (e.g., commands and instructions) from the eye-tracking module 328, interact with user 332 in order to generate ocular sensor data, and provide the ocular sensor data to eye-tracking module 328. In these embodiments, ocular sensor data includes data describing the movement of the eyes of user 332 and/or the duration of time the eyes of the user 332 are fixed at the user interface or in a direction away from the user interface. In an example, eye-tracking sensor 326 is implemented as software configured to control camera hardware (e.g., a camera pair, not shown) included within user device 310 that is configured to determine the direction of the gaze of user 332. In this example, ocular sensor data includes the length of stare of user 332 on one or more regions of content being displayed via user interface 318, whether or not user 332 is looking at one or more portions of content being displayed via user interface 318, and the path of the gaze of user 332 as user 332 views content being displayed via user interface 318 or gazes in a direction away from the content on the display, such as towards the road.

Eye tracking module 328 may utilize sensor or camera data to determine the gaze of a user. In one embodiment, a light (e.g., infrared) is reflected from the user's eye and a video camera or other sensor can receive the corneal reflection. The eye tracking module 328 as shown in FIG. 3 analyzes the ocular sensor data to determine eye rotation from a change in the light reflection. A vector between a pupil center and the corneal reflections can be used to compute a gaze direction. Eye movement data may be based upon a saccade and/or a fixation, which may alternate. A fixation is generally maintaining a visual gaze on a single location, and it can be a point between any two saccades. A saccade is generally a simultaneous movement of both eyes between two phases of fixation in the same direction In one implementation, the eye tracking module can use a dark-pupil technique, whereby if the illumination source is offset from the optical path, then the pupil appears dark as the retroreflection from the retina is directed away from the camera. In another implementation, the eye tracking module can use a bright-pupil technique, whereby if the illumination is coaxial with the optical path, then the eye acts as a retro reflector as the light reflects off the retina creating a bright pupil effect.

In another embodiment, a camera or sensor can track eye image features (e.g., retinal blood vessels) and follow the features as the eye rotates. It is preferable that the eye tracking data is obtained in a manner that is non-invasive.

In yet another embodiment, a camera or sensor can identify a location of an iris or pupil based on the circular shape or by detection an edge. The movement of the iris or pupil can then be detected.

In some embodiments, the eye tracking module 328 can use a coding system that recognizes eye movement and/or gaze direction and generates a score based on duration and direction. Eye movement or gazing may have a duration of about $\frac{1}{25}$ of a second to 2 seconds or longer, so the eye tracking module 328 will receive a data feed of eye movements from a high speed camera having increments of less than one second to account for very quick changes. Some micro-eye movements occur so quickly that a human observer cannot detect or sense the shift in gaze or eye movement. In one embodiment when at there is at least one of eye movement and/or eye gaze that is directed toward the displayed content, and/or the user device, there will be a change in the displayed content and/or information (e.g., audio such as music, directions, a podcast and the like) presented to the user. In an exemplary embodiment, the change in the displayed content is that the display will appear blank and no content will be displayed to the user. In another example, the displayed content may change to a message directed to the user, e.g., "pay attention to the road." In an example, the change in the content presented to the user is that the audio stops or is paused. In another example the change in content presented to the user is an audio message, e.g., "pay attention to the road."

In these embodiments, the change in the displayed content may require a threshold amount of time that a eye-movement or gaze is maintained (e.g., $\frac{1}{25}$ second, % second, $\frac{1}{3}$ second, %$_2$ second, 1 second, 2 seconds, 3 seconds, 4 seconds, 5 seconds, 6 seconds, 7, seconds, 8 seconds, 9 seconds or 10 seconds) before a change to the displayed content is implemented.

In another embodiment when at there is at least one of eye movement and/or eye gaze that is directed away from the displayed content, and/or the user device, the displayed content and/or information will continue to be displayed to the user.

In another embodiment when at there is at least one of eye movement and/or eye gaze that is directed away from the displayed content, and/or the user device, there will be a change in the displayed content and/or information (e.g., audio such as music, directions, a podcast and the like) presented to the user. In an example, the change in the displayed content is what the display will display to the user. In an example, the displayed content may be a map or other navigational feature. In an example, the change in the content presented to the user is that the audio begins or resumes play. In an example the audio is music or a podcast.

In these embodiments, the change in the displayed content may require a threshold amount of time that a eye-movement or gaze is maintained (e.g., ⅕ second, ½ second, ⅓ second, ¾ second, 1 second, 2 seconds, 3 seconds, 4 seconds, 5 seconds, 6 seconds, 7, seconds, 8 seconds, 9 seconds or 10 seconds) before a change to the displayed content is implemented.

In an embodiment that utilizes head tracking, the tracking sensor 126 is a head tracking sensor that is implemented as software configured to control associated hardware and configured to receive hardware operation data from head-tracking module 128 and interact with user 132 in order to generate head position data, and provide the head position data to head tracking module 128. In these embodiments, head position data includes data describing the movement of the user's head 132. In an example, head-tracking sensor module 126 is implemented as software configured to control camera hardware (e.g., a camera pair, not shown) included within user device 110 that is configured to determine the position of the user's 132 head. In this example, head position data includes the position of the user's 132 head with respect to one or more regions of content being displayed via user interface 118, whether or not user 132 is looking at one or more portions of content being displayed via user interface 118, the path of the head movement user 132 as user 132 views content being displayed via user interface 118, and the path of the head movement user 132 as user's head is directed away from content being displayed via user interface 118.

Head tracking module 128 may utilize sensor or camera data to determine the initial head position of a user and any subsequent change from the initial head position. In one embodiment, a light (e.g., infrared) is reflected from the user's head and a video camera or other sensor can receive the reflection from the user's head. The head tracking module 128 analyzes the head position data to determine head movement from a change in the light reflection. A vector between a location on the user's head and the head reflections can be used to compute a change in head position or direction. Head position data may be based upon a movement and/or a fixation, which may alternate. A fixation is generally maintaining a head position in single location. A movement is generally any change in position of the head from an initial position.

In one implementation, the head tracking module can use a marker technique, whereby if the illumination source is offset from the marker on the user movement is determined.

In another embodiment, a camera or sensor can track head image features (e.g., how much of the head is shown, if only a portion of the head e.g., a cheek or the top of the head) and follow the features as the head rotates or moves. It is preferable that the head tracking data is obtained in a manner that is non-invasive.

In some embodiments, the head tracking module 128 can use a coding system that recognizes head movement, change in position of the head and/or head image features generates a score based on duration of head movement, direction of the head movement and/or head image features. Head movement or position may have a duration of about 1 second, 2 seconds, 3 seconds, 4 seconds, 5 seconds to 10 seconds or longer, so the eye tracking module 128 will receive a data feed of head movements from a high speed camera having increments of less than one second to account for very quick changes. In one embodiment when at there is at least one of head movement and/or head position that is directed toward the displayed content, and/or the user device, there will be an automatic change in the displayed content and/or information (e.g., audio such as music, directions, a podcast and the like) presented to the user. In an example the change in the displayed content is that the display will appear blank and no content will be displayed to the user. In another example, the displayed content may change to a message directed to the user, e.g., "pay attention to the road." In an example, the change in the content presented to the user is that the audio stops or is paused. In another example the change in content presented to the user is an audio message, e.g., "pay attention to the road."

In these embodiments, the change in the displayed content may require a threshold amount of time that a head movement or head position is maintained (e.g., 1 second, 2 seconds, 3 seconds, 4 seconds, 5 seconds, 6 seconds, 7, seconds, 8 seconds, 9 seconds or 10 seconds or longer) before a change to the displayed content is implemented.

In another embodiment when there is at least one of eye movement and/or eye gaze that is directed away from the displayed content, and/or the user device, the displayed content and/or information will continue to be displayed to the user.

In another embodiment when at there is at least one of head movement and/or head position that is directed away from the displayed content, and/or the user device, there will be a change in the displayed content and/or information (e.g., audio such as music, directions, a podcast and the like) presented to the user. In an example, the change in the displayed content is that the display will display to the user. In an example, the displayed content may be a map or other navigational feature. In an example, the change in the content presented to the user is that the audio begins or resumes play. In an example the audio is music or a podcast.

In these embodiments, the change in the displayed content may require a threshold amount of time that a head movement and/or head position is maintained (e.g., 1 second, 2 seconds, 3 seconds, 4 seconds, 5 seconds, 6 seconds, 7, seconds, 8 seconds, 9 seconds or 10 seconds or longer) before a change to the displayed content is implemented.

In another embodiment, when there is at least one change in the head image detected by the sensor, (e.g., how much of the head is shown, if only a portion of the head e.g., a full view of the face, a profile, a cheek, the top, bottom or side of the head) and follow the features as the head rotates or moves.

In these embodiments there will be a change in the displayed content and/or information (e.g., audio such as music, directions, a podcast and the like) presented to the user. In an example, the change in the displayed content is that the display will display to the user. In an example, the displayed content may be a map or other navigational feature. In an example, the change in the content presented to the user is that the audio begins or resumes play. In an example the audio is music or a podcast.

In these embodiments, the change in the displayed content may require a threshold amount of time that change in the head image detected by the sensor is maintained (e.g., 1 second, 2 seconds, 3 seconds, 4 seconds, 5 seconds, 6 seconds, 7, seconds, 8 seconds, 9 seconds or 10 seconds or longer) before a change to the displayed content is implemented.

In an embodiment where the sensor includes an accelerometer, the device may typically have two or three accelerometers, to measure the acceleration along at least one of the orthogonal axes (x, y, z) in physical space. The accelerometers as shown in FIG. 2A are denoted here 246$x$, 246$y$, and 246$z$ for the respective axis along which they are oriented. These three axes for a mobile device 100 are illustrated in FIG. 2B. An accelerometer measures proper acceleration ("g-force"), which is the acceleration of an object relative to gravitational free fall. For example, an accelerometer in free fall will thus detect an acceleration of zero. An accelerometer at rest on Earth will measure an acceleration of 9.8 m/s$^2$ upward (equal to the gravitational acceleration (g) of Earth) because the accelerometer must experience an upward force of 1G to counteract the downward force of gravity.

Each accelerometer 246$x$, 246$y$, 246$z$ is integrated into the hardware and operating system of the mobile device. A smart phone includes a processor 221, operating system 222 (such as iOS in the Apple iPhones or Android in certain other smart phones), memory 223, and software for performing its many functionalities. For example, the processor 221 in a smart phone receives data from the accelerometers 246$x$, 246$y$, 246$z$, processes that data to determine the orientation of the device, and then determines whether to change the display from portrait to landscape, or vice versa. The accelerometer and other sensor data in an iPhone may be accessed and processed using the Core Motion Framework, a C-based programming language. The CMMotionActivity class, for example, contains the data for a single motion update event, while the CMSensorRecorder class controls the gathering and retrieval of accelerometer data from a mobile device. The CMMotionManager class provides both "push" and "pull" access to all of the motion data on an iOS device. To "pull" motion data, the current status of the sensor data or composited data can be accessed as read-only properties of CMMotionManager. To receive "pushed" data, the desired data can be collected with a block or closure that receives updates at a specified interval, which can be programmed (in seconds) using "accelerometerUpdateInterval." For example, a shorter interval for updating accelerometer data may be selected for higher responsiveness or sensitivity, while a longer update interval may be selected to reduce CPU usage. Higher sensitivity may also be accomplished by combining the accelerometer data with data from the gyroscopes or other sensors as well.

In one embodiment, the accelerometers on the smart phone serve as proxies for monitoring the acceleration experienced by the user of the smart phone, as a user typically leaves her smart phone turned on at almost all times and typically carries it with her when she travels. In this example, if the user swerves to avoid a deer or other obstacle, or abruptly slows down to avoid a collision, begins to speed up indicating that a vehicle is being operated, or maintains a constant speed, the change or no change in acceleration or deceleration will be recorded by the accelerometers in the user's smart phone 200.

In one embodiment when there is at least one of increase or decrease in acceleration there will be an automatic change in the displayed content and/or information (e.g., audio such as music, directions, a podcast and the like) presented to the user. In an example the change in the displayed content is that the display will appear blank and no content will be displayed to the user. In another example, the displayed content may change to a message directed to the user, e.g., "pay attention to the road." In an example, the change in the content presented to the user is that the audio stops or is paused. In another example the change in content presented to the user is an audio message, e.g., "pay attention to the road."

In these embodiments, the change in content may require a threshold amount of time that acceleration or deceleration occurs (e.g., ½s second, ¼ second, ⅓ second, ⅜ second, 1 second, 2 seconds, 3 seconds, 4 seconds, 5 seconds, 6 seconds, 7, seconds, 8 seconds, 9 seconds or 10 seconds or more) before a change to the displayed content is implemented.

In another embodiment when at the accelerometer detects that there is no movement or the movement is at a consistent speed (e.g., no abrupt stops or accelerations) the displayed content and/or information will continue to be displayed to the user.

In another embodiment when at the accelerometer detects that there is no movement or the movement is at a consistent speed (e.g., no abrupt stops or accelerations) there will be an automatic change in the displayed content and/or information (e.g., audio such as music, directions, a podcast and the like) presented to the user. In an example, the change in the displayed content is that the display will display content to the user. In an example, the displayed content may be a map or other navigational feature. In an example, the change in the content presented to the user is that the audio begins or resumes play. In an example the audio is music or a podcast.

In these embodiments, the change in the displayed content may require a threshold amount of time that the accelerometer detects that there is no movement or the movement is at a consistent speed (e.g., no abrupt stops or accelerations) (e.g., 1 minute 2 minutes, 3 minutes, 4 minutes, 5 minutes 6 minutes, 7 minutes, 8 minutes, 9 minutes or 10 minutes or more) before a change to the displayed content is implemented.

FIG. 2A is a functional block diagram illustrating a system architecture for control of content to a user device, according to an embodiment. In FIG. 2A, the system architecture includes a device 200, such as a mobile phone or smart phone, tablet, personal digital assistant (PDA), laptop, or other mobile device that includes one or more sensors. For purposes of illustration only and not limitation, this device 200 includes at least one accelerometer 246, and typically two or three accelerometers, to measure the acceleration along at least one of the orthogonal axes (x, y, z) in physical space. The accelerometers are denoted here 246$x$, 246$y$, and 246$z$ for the respective axis along which they are oriented. These three axes for a user device 200 are illustrated in FIG. 2A. An accelerometer measures proper acceleration ("g-force"), which is the acceleration of an object relative to gravitational free fall. For example, an accelerometer in free fall will thus detect an acceleration of zero. An accelerometer at rest on Earth will measure an acceleration of 9.8 m/s$^2$ upward (equal to the gravitational acceleration (g) of Earth) because the accelerometer must experience an upward force of 1G to counteract the downward force of gravity. A user device 200 typically includes other sensors for inputting information, such as one or more gyroscopes 247 for detecting rotational movement, a magnetometer 243 for detecting magnetic fields (e.g., for the compass), light sensors 244 (e.g., for the camera), a system for detecting and processing GPS signals 248 (e.g., for determining location and direction of travel), a touch pad 245, and a microphone 242 for detecting sound.

Each accelerometer 246*x*, 246*y*, 246*z* is integrated into the hardware and operating system of the device. A user device 200 includes a processor 221, operating system 222 (such as iOS in the Apple iPhones or Android in certain other smart phones), memory 223, and software for performing its many functionalities. For example, the processor 221 in a device receives data from the accelerometers 246*x*, 246*y*, 246*z*, processes that data to determine the orientation of the device, and then determines whether to change the display from portrait to landscape, or vice versa. The accelerometer and other sensor data in an iPhone may be accessed and processed using the Core Motion Framework, a C-based programming language. The CMMotionActivity class, for example, contains the data for a single motion update event, while the CMSensorRecorder class controls the gathering and retrieval of accelerometer data from a mobile device. The CMMotionManager class provides both "push" and "pull" access to all of the motion data on an iOS device. To "pull" motion data, the current status of the sensor data or composited data can be accessed as read-only properties of CMMotionManager. To receive "pushed" data, the desired data can be collected with a block or closure that receives updates at a specified interval, which can be programmed (in seconds) using "accelerometerUpdateInterval." For example, a shorter interval for updating accelerometer data may be selected for higher responsiveness or sensitivity, while a longer update interval may be selected to reduce CPU usage. Higher sensitivity may also be accomplished by combining the accelerometer data with data from the gyroscopes or other sensors as well.

A user device 200 also includes a bidirectional radio transmitter/receiver 202 that enables the smart phone to send and receive information wirelessly via a cell tower or wireless router to another device, server, or network (e.g., LAN, WAN, VPN, or WWW, among others). The user may use his or her user device 200 to communicate through any of a number of communication technologies, such as text 210 (e.g., SMS, MMS), a banner 211 on the liquid crystal display 201, electronic mail 212, web browsing 213, voice or voice mail 214, to name a few. In some cases, the software for operating these functions is installed on the user device 200; in other cases, software may be downloaded or modified by the user of the smart phone.

In particular, the user may personalize the functionality of his or her smart phone by downloading various mobile applications, e.g., 231, 232, 233, 234, such as mobile applications for banking, life or automobile insurance, cell phone or Internet service providers, mapping devices, podcasts, music, or shopping networks, to name only a few. When a user downloads an application on the device it is integrated with the device's existing operating system 222 and other software to perform its intended operations, such as accepting input from the keypad, accessing the radio transmitter, transmitting and receiving information to and from the Internet, displaying text and video information on the liquid crystal display, and performing other operations. If the device is a mobile device, the mobile applications, such as those for banks, insurance companies, Internet or cell phone providers, mapping services, podcasts, shopping, and other such applications, are typically capable of both "push" and "pull" capabilities.

FIG. 3 is an exemplary computing device 300 in which one or more embodiments of the present disclosure may operate, according to an embodiment. In FIG. 3, the device is one of a device, such as a mobile phone or smart phone, tablet, personal digital assistant (PDA), laptop, or other mobile device that includes one or more sensors. The computing device 300 includes user device bus 312, processor 314, input/output module 316, user interface 318, memory 320, storage device 322, user device interface 324, a tracking sensor 326 and tracking module 328. In some embodiments, the computing device can include additional, fewer, or differently arranged components than those illustrated in FIG. 3.

As described in the various embodiments, the tracking sensor 326 can include at least one of a head-tracking sensor, an ocular sensor, or an accelerometer. The computing device can include other sensors for inputting information, such as one or more gyroscopes 247 for detecting rotational movement, a magnetometer 243 for detecting magnetic fields (e.g., for the compass), light sensors 244 (e.g., for the camera), a system for detecting and processing GPS signals 248 (e.g., for determining location and direction of travel), a touch pad 245, and a microphone 242 for detecting sound, as shown in FIG. 2A.

In FIG. 3, computing device 310 user device bus 312 is electronically coupled to and in bi-directional communication with processor 314, input/output module 316, memory 320, storage device 322, user device interface 324, tracking sensor 326, tracking sensor module 318, and network interface 324. In these embodiments, user interface 318 is rendered by input/output module 316. Further to these embodiments, user interface 318, and tracking sensor 326 are configured to interact with user 332 and receive behavioral information from the user 332. In these embodiments, user device bus 312 includes a path that allows components within user device 310 to communicate with each other.

In some embodiments, processor 314 is implemented as computing hardware component including a central processing unit able to carry out instructions to perform one or more instructions associated with user device 310. In these embodiments, processor 314 can include a microprocessor, an application specific integrated circuit (ASIC), a field programmable object array (FPOA), and the like. Further to these embodiments, processor 314 interprets and executes instructions retrieved from memory 320 and storage device 322.

In an example processor 314 is configured to interpret and execute instructions associated with the operation of user device communication module 312, input/output module 314, user interface 316, tracking sensor module 318 and tracking sensor 326. In these embodiments, processor 314 is implemented as any computing hardware component including a central processing unit able to execute instructions to perform one or more actions associated with implementing functionality and/or process instructions for execution on the user device 310. Still further to these embodiments, processor 314 can include a microprocessor, an application specific integrated circuit (ASIC), a field programmable object array (FPOA), and the like. In these embodiments, processor 314 interprets and executes instructions retrieved from memory 320 and/or storage device 322. In an example, processor 314 is configured to interpret and execute instructions associated with the operation of tracking sensor 326.

In some embodiments, input/output module 316 is implemented as a computer hardware component that includes peripherals and/or other mechanisms that may enable a user to input information to user device 310, including keyboards, computer mice, buttons, touch screens, voice recognition, biometric mechanisms, and the like. In these embodiments, input/output module 316 may be further configured to include one or more mechanisms for outputting information to user 332, such as, for example displays, light emitting diodes (LEDs), printers, speakers, and the like. Further to these embodiments, input/output module 316 is implemented to include a computer hardware component able to output data to user 332 via textual and/or graphical content, images, videos, audio, such as a podcast, and the like. In these embodiments, input/output module 316 is further configured to provide content by rendering the content onto user interface 318 and to receive input from user 332 via user interface 318.

In some embodiment user interface 318 is implemented as a software module running on associated hardware configured to receive input from user 332, process the received input into input data, provide the input data to input/output module 316, receive content from input/output module 316, and display content to user 332. In these embodiments, input data includes user requests to display a desired set of content, user instructions to display supplemental content associated with the display of content, and the like.

In some embodiments memory 320 is implemented as a computing hardware component that allows the storage and manipulation of data during operations carried out by processor 314. In an example, memory 320 allows the storage and manipulation of data during operations associated with user device communication module 312 (e.g., a communication bus), input/output module 316, user interface 318, and tracking sensor module 326. In these embodiments, memory 320 is implemented as computer hardware component that allows the storage and manipulation of data during operations carried out by processor 314. In an example, memory 320 allows the storage and manipulation of data during operations associated with tracking sensor 326, and/or input/output module 316. Examples of memory 320 include random access memory (RAM), Dynamic RAM (DRAM), Static RAM (SRAM) read-only memory (ROM), flash memory, and the like.

In some embodiments, storage device 322 is implemented as a computer hardware component that allows the storage and retrieval of data associated with running one or more modules and executable versions of the one or more modules and is configured to store information and instructions for execution by processor 314 to control the associated componentry within user device 310. In an example storage device 322 is implemented to store and retrieve data associated with one or more of input/output module 316, user interface 318, and tracking sensor 326, for execution by processor 314 to control the associated componentry within system hardware 300. In these embodiments, storage device 322 is implemented as a computer hardware component that allows the storage and retrieval of data associated with running one or more modules and executable versions of the one or more modules and is configured to store information and instructions for execution by processor 314 to control the associated componentry within server 300. Examples of storage device 322 include magnetic and/or optical recording media, ferro-electric RAM (F-RAM) hard disks, solid-state drives, floppy disks, optical discs, Electrically Programmable Memories (EPROMs), Electrically Erasable and Programmable Memories (EEPROMS) and the like.

In some embodiments, tracking sensor 326 is an eye-tracking sensor implemented as a computer hardware component configured to track the gaze of user 332. In these embodiments, eye-tracking sensor 326 can be implemented as an optical tracking device, such as an infrared emitter and camera, a video camera, and the like. In an example and referring to FIG. 3, eye-tracking sensor 326 is configured to be controlled by eye-tracking module 328. Further to these embodiments the tracking sensor 326 is a head-tracking sensor which is implemented as software configured to track the position of the user's head. In these embodiments, head-tracking-sensor 326 can be implemented as a physical tracking devices, such as an infrared emitter and camera, a video camera and the like. In an example and referring to FIG. 1, head-tracking sensor 126 is configured to be controlled by head-tracking module 128. Further to these embodiments, the sensor is one or more accelerometers configured to measure the acceleration along at least one of the orthogonal axes (x, y, z) in physical space. In these embodiments, the accelerometer measures proper acceleration ("g-force"), which is the acceleration of an object relative to gravitational free fall. For example, an accelerometer in free fall will thus detect an acceleration of zero. In another embodiment, the processor monitors the acceleration data only when the speed of the device, as determined by the rate of change of position as determined with the GPS system, exceeds a certain minimum, such as 5 mph. In this embodiment, the processor can dynamically monitor the effective speed of the vehicle by determining the change in location of the mobile device at regular intervals. In this embodiment the processor compares the distance the vehicle has traveled during a predetermined interval (i.e., its speed) and compares that distance (or speed) to a predetermined threshold. If the processor determines the device is traveling faster than the predetermined speed threshold, the processor may automatically begin to continuously collect or monitor the acceleration data of the user device using a tracking sensor, change the display content, or both. If the processor determines the mobile device is traveling more slowly than the predetermined speed threshold, the processor will not monitor or collect the acceleration data, resume the display content, do nothing, or both. In another embodiment, the processor can continuously collect or monitor user behavior data using a tracking sensor and a signal is sent when the user of the device's behavior occurs for a period of time that indicates the user is no longer distracted or is not distracted for an unsafe time period. In an embodiment, where the user of the device's behavior indicates that the user is not distracted, the display continues or resumes the display of content on the display and/or transmission of sound.

In other embodiments, user device interface 324 is implemented as a computer hardware components configured to allow user device 310 to communicate with other computing devices and/or systems through network connections. Examples of network connections include any suitable connections between computers, such as, for example intranets, local area networks (LANs), virtual private networks (VPNs), wide area networks (WANs), the Internet, and the like. User device interface 324 can be implemented as any suitable interface, such as, network interface controllers, wireless network interface controllers, and the like.

Figure 4:
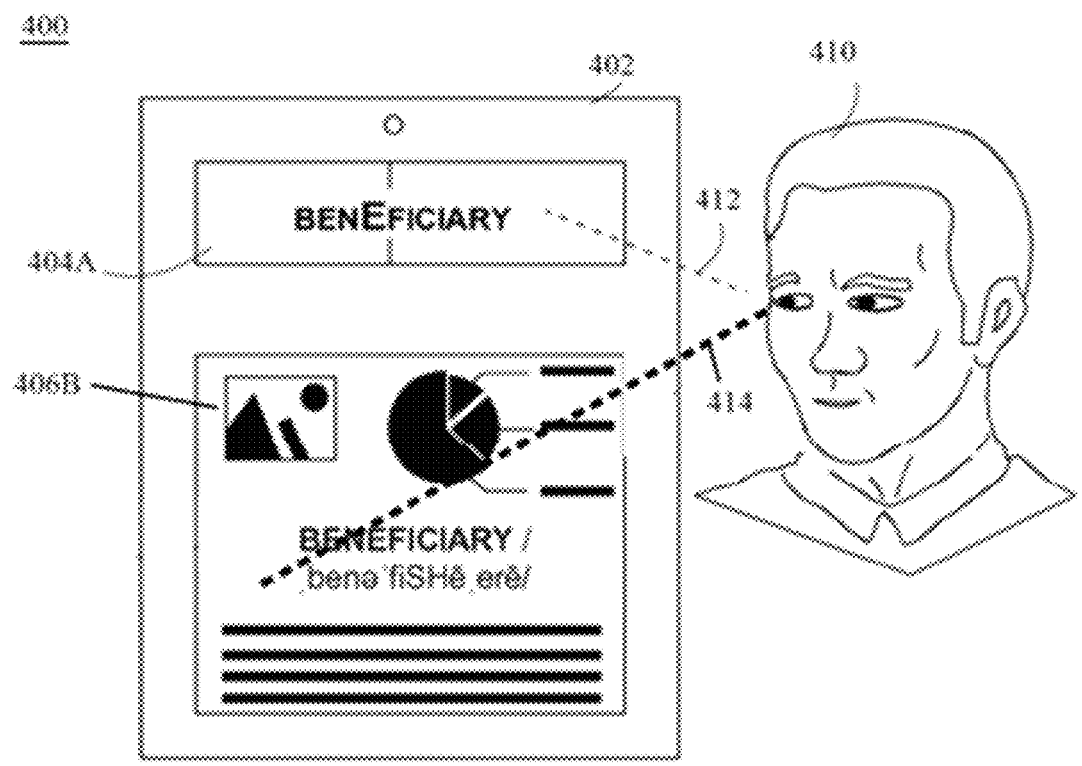
FIG. 4 illustrates a content display device, according to an exemplary embodiment.

FIG. 4 is a block diagram illustrating a first exemplary use case for controlling content display based on behavioral feedback, according to an embodiment. In FIG. 4, use case 400 includes user device 402 and user 410. In FIG. 4, user device 402 includes content display 404a and 404b. Additionally, user display device can include audio content consumed via a speaker coupled to the device and/or a sound system coupled to the device.

In some embodiments, the gaze of user 410 can be characterized by first gaze line 412 and second gaze line 414. Use case 400 can include additional, fewer, or differently arranged components than those illustrated in FIG. 4.

In some embodiments, user device 402 is implemented as a computing device configured to generate by a processing module content data configured for presentation on a display of the user computing device, transmit the content data to one of the display of the user computing device for display on the user computing device, to a speaker of the user computing device for audio transmission, or both and collect behavior data of the user sensed by the tracking sensor. In these embodiments, the processing module of the user computing device determines whether behavior data represents a value that satisfies a threshold value and when the value satisfies the threshold value, generate a change in the content data presented on at least one of the display of the user computing device, the speaker of the user computing device, or both. In these embodiments when the value does not satisfy the threshold value the same content data on at least one of least one of the display of the user computing device is displayed, the speaker of the user computing device transmits sound, or both.

In an example and referring to FIGS. 1 and 3, user device 402 is configured in a manner substantially similar to user device 110 and user device 310. In these embodiments, content display 404A, 404B is implemented on the user interface associated with user device 402 and configured to display content or transmit sound. Further to these embodiments, the content display 404A, 404B is changed when the user gaze or head movement is directed towards the content. In an example this is represented by gaze line 412 or gaze line 414. In an embodiment, the content displayed on the screen changes when the user gaze or head movement is directed towards the content and a threshold value is met. In another embodiment the content display 404A, 404B is changed when the accelerometer detects a sudden increase in speed, a sudden decrease in speed or a constant speed.

In operation, user device 402 displays content. In some embodiments, user device 402 monitors the behavior of user 410 in order to generate behavioral data. In an example, tracking sensor module controls tracking sensor and begins to track the movements of the user in order to generate behavioral data, and receives the generated sensor data from tracking sensor module. In some embodiments, user device 402 changes the content displayed on the display and/or transmitted via audio based on the behavioral data. Further to this embodiment, behavioral data is the gaze of user 410 which is characterized by a gaze in the direction of the device display, e.g., gaze line 412 or gaze line 414. Further to this embodiment, the content on the display is changed when the behavioral data meets at threshold value.

Figure 5A:
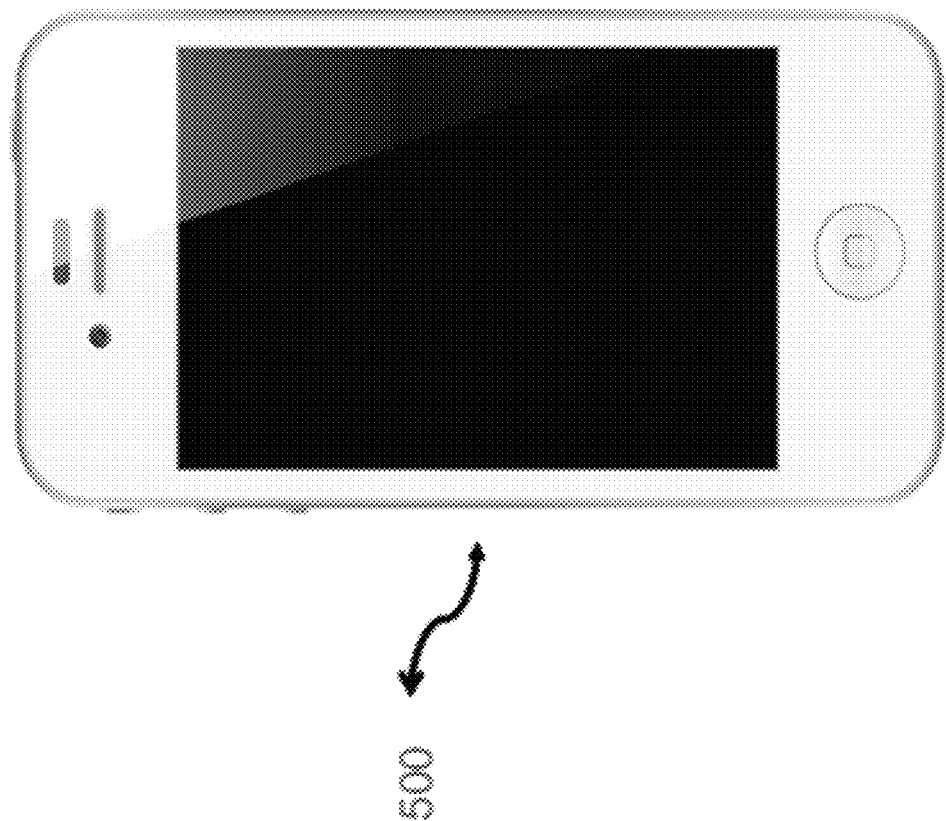
FIG. 5A illustrates a content display device, according to an exemplary embodiment.
Figure 5B:
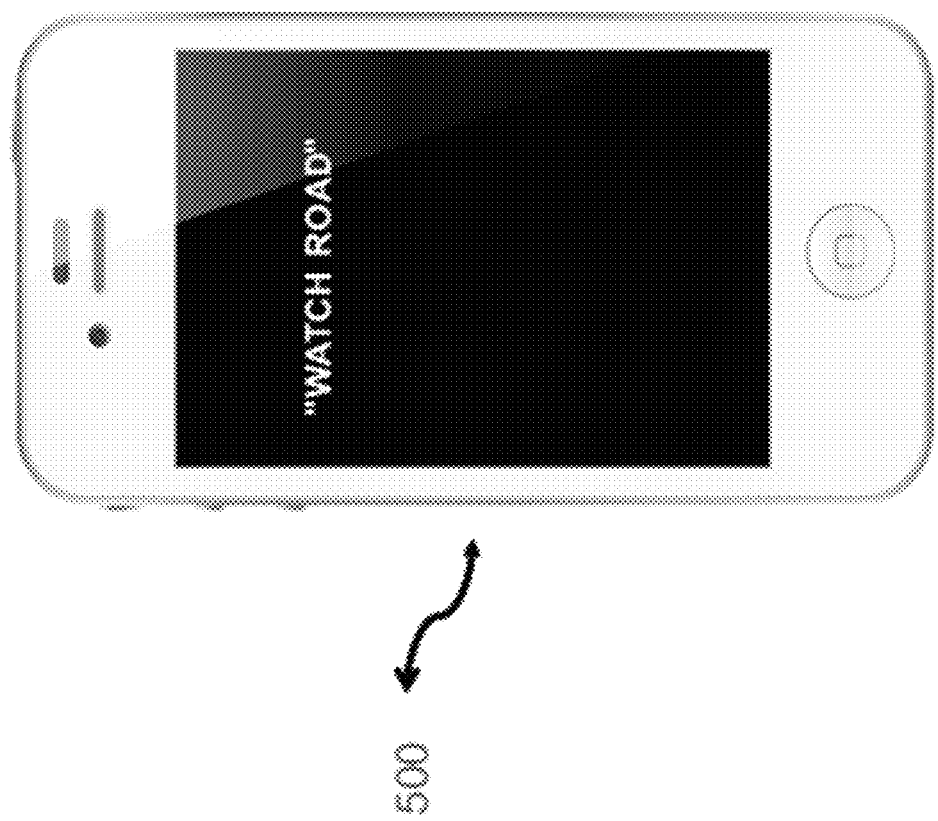
FIG. 5B illustrates a content display device, according to an exemplary embodiment.

In an embodiment, the behavioral data can be assigned a value, which can represent an amount of time that the user's gaze is directed toward the display or away from the display. For example, if the user is gazing at an item for more than one second, the user may not be focusing on another task such as looking at the road while driving. In another example, if the user is gazing away from the user interface for more than one second, the user may be focusing on another task, such as looking at the road while driving, answer a phone or engaging in a conversation. In the exemplary embodiment, the threshold value is set at four seconds, but any time period can be used. When the gaze is directed towards the display and the value is above this threshold value, the system can automatically change the content displayed to the user, e.g., turn off audio, pause or stop displayed content, display a blank screen or display a message to the user (as shown in FIGS. 5A and 5B). When detecting whether a user's eyes are directed away from the device display, a different threshold value can be used, which can be established at 4 seconds, 5 seconds, 6 seconds, 7 seconds, 8 seconds or more when this threshold value is met the content can automatically resume.

In an embodiment, the behavioral data can be assigned a value, which can represent an amount of time that the user's face is directed toward the display or away from the display and/or if the amount of the face and or head of the user detected by the sensor changes. For example, if the user is gazing at the display the full head of the user may be detected as facing the display by the sensor, if only a portion of the face or head is detected by the user e.g., % of the face, or % of the face, or % of the face, the user may still be viewing the display, either out of the corner of their eye or by glancing at the display. In either case, the user may not be focusing on another task such as looking at the road while driving. In another example, if the user's face is directed away from the display and/or the amount of the face and or head directed toward the display changes, the user may be focusing on another task, such as looking at the road while driving, answer a phone or engaging in a conversation. In the exemplary embodiment, the change in the amount of the user's head and/or face detected by the sensor can cause a change in the content displayed to the user. In another exemplary embodiment, the change in content can occur when the change in the amount of the user's head and/or face detected by the sensor meets a threshold value e.g., four seconds (but any time period can be used.) When the full face of the user is detected by the sensor and the value is above this threshold value, the system can automatically change the content displayed to the user, e.g., turn off audio, pause or stop displayed content, display a blank screen or display a message to the user. When a portion of the face or head facing the display is detected by the tracking sensor meets a predetermined threshold amount, e.g., more than or equal to e.g., % of the face or head facing the display, % of the face or head facing the display, % of the face or head facing the display, or the full face or head facing the display, the system can determine that enough head movement has been detected for the system to automatically change the content displayed to the user, e.g., turn off audio, pause or stop displayed content, display a blank screen or display a message to the user. When the user's face or head is directed away from the display and/or the amount of the face and or head directed toward or facing the display changes to below the predetermined threshold amount so that only a profile of the user is captured, the system can automatically change the content displayed to the user, e.g., resume audio and/or display content. When detecting whether a user's eyes are directed away from the device display, a different threshold value can be used, which can be established at 4 seconds, 5 seconds, 6 seconds, 7 seconds, 8 seconds or more when this threshold value is met the content and/or audio can automatically resume.

In some embodiments, content display 404A, 404B can be automatically changed when the accelerometer detects a sudden increase in speed, a sudden decrease in speed or a constant speed user device 402. In these embodiments, the system can change the content displayed to the user, e.g., turn off audio, pause or stop displayed content, display a blank screen or display a message to the user when there is an increase in acceleration and a threshold value is met and/or when there is a decrease in acceleration and a threshold value is met. When detecting that the acceleration is constant and a threshold value is met, the content and/or audio can resume.

FIGS. 5A and 5B illustrate an embodiment of the invention where the content display is changed. In FIG. 5A, the screen display goes blank. In FIG. 5B, the screen displays a message. Alternatively, the device can play an audio file with a message, such as "watch road."

Figure 6:
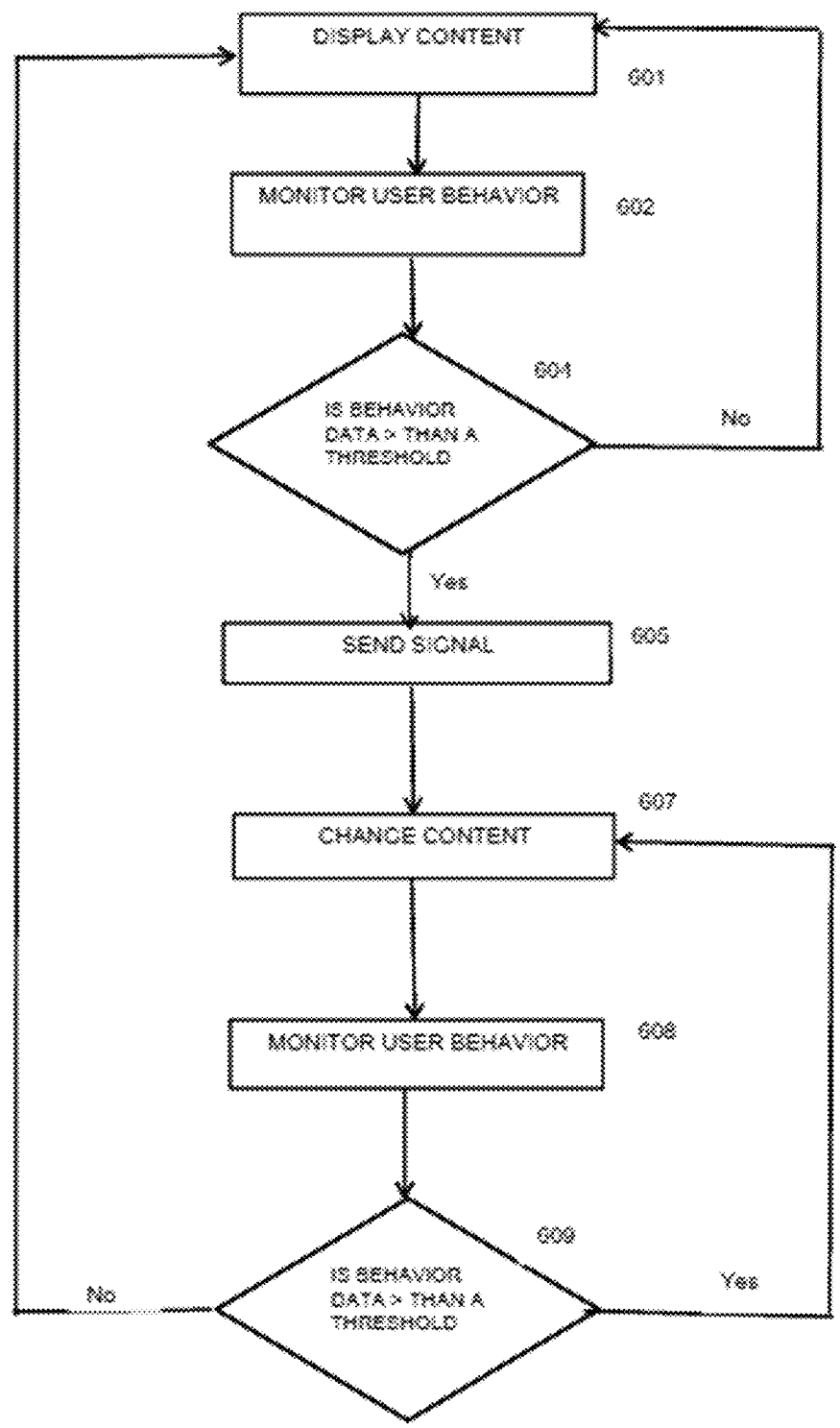
FIG. 6 a flowchart of a method for controlling content display according to an exemplary embodiment.

FIG. 6 is a flowchart illustrating an exemplary method of controlling content display according to an embodiment. In some embodiments, method 600 includes additional or fewer steps than those depicted in FIG. 6. In these embodiments, one or more steps may be performed in parallel or in a sequence different from that depicted in FIG. 6. In FIG. 6, method 600 begins with step 601.

In step 601, the display of the user device displays content, transmits sound, or both to the user. In an embodiment the content can be a map, a podcast, streaming music and the like. Step 601 continues to step 602.

In step 602, the behavioral data of the user is monitored by a sensor and sent to the processor. In one embodiment, the processor is continually monitoring the behavior data, but this type of continual monitoring may be unnecessary given the user is not always traveling in a vehicle or in an environment where a distraction could occur. Continual monitoring according to the invention may also tie up processing power and shorten battery life. In another embodiment (not shown), the processor monitors the behavior data only when the speed of the device, as determined by the rate of change of position as determined with the GPS system, exceeds a certain minimum, such as 5 mph according to known methods in the art. In this embodiment, if the processor determines the device is traveling faster than the predetermined speed threshold, the processor will begin monitoring the behavior data as described above. If the processor determines the device is traveling more slowly than the predetermined speed threshold, the processor will not monitor the behavior data. This will limit application of the invention to those periods of time when the user is mostly likely to be carrying his or her smart phone while traveling in a vehicle.

In step 604, the processor compares the behavior data to a predetermined threshold. For example, in an embodiment, the behavior data is behavior extracted from the user captured using a head-tracking sensor which extracts information about the user's head movement and duration of the head movement in a direction within a boundary associated with one or more portions of the content. When the user's head movement is directed to a boundary associated with at least a portion of the content, the threshold value that the head movement is maintained can be about 1 second, 2 seconds, 3 seconds, or 4 seconds. In another exemplary embodiment, the behavior data is behavior extracted from the user using an eye-tracking sensor which extracts information about the user's eye movement and duration of the users gaze within a boundary associated with one or more portions of the content. In this embodiment when the user's gaze is in a direction of a boundary associated with at least a portion of the content, the threshold value that the gaze is maintained can be about 500 ms, 1 second, 2 seconds, 3 seconds, 4 seconds or 5 seconds. In another embodiment, the predetermined threshold can be the image captured by the head-tracking sensor. For example, if the image capture of the head is a 100%, % of the face or ½ of the face the threshold value is met. In an exemplary embodiment, this predetermined threshold may be fixed and programmed into a mobile application. In another embodiment, not shown, the predetermined threshold value may be determined by the user's behavior data history. For example, the processor may record certain head images, head movements and/or eye movement sensed by the device over a period of time, and then prepare a statistical analysis to identify the range of images or movements values most commonly experienced by the device, and presumably by its user as well. The processor would use this range of values to determine the appropriate behavioral threshold. To avoid consuming excessive processing power, the application may be programmed to perform this type of analysis periodically, e.g., once a day, or week, or month, as appropriate.

If the processor in step 604 determines the behavior data is below the predetermined threshold, the processor continues monitoring the behavior data but takes no further action, e.g., the content on the display will continued to be display, the audio will continue to be transmitted, or both. If, however, the processor in step 604 determines the behavior data exceeds the predetermined threshold value, then the process proceeds to step 605.

In step 605, the processor transmits a signal to an application and/or processor. This signal in other words, is sent when the user of the device's behavior occurs for a period of time that may mean the user is distracted for a value of time that is unsafe. In an exemplary embodiment, gazing at the display, a facial image that is interpreted to mean the user is gazing at the display and not in another direction, e.g., the road, will trigger the transmission of a signal to the application and/or processor. Step 605 proceeds to step 607.

In step 607, the processor and/or application responds to the signal by changing the content displayed. In an embodiment, where the user of the device's behavior indicates that the user is distracted, the display appears blank, a brief message appears on the display and/or the audio is not transmitted. Step 607 proceeds to step 608.

In step 608, the behavioral data of the user is monitored by a sensor and sent to the processor. In one embodiment, the processor is continually monitoring the behavior data, but this type of continual monitoring may be unnecessary given the user is not always traveling in a vehicle or in an environment where a distraction could occur. Continual monitoring according to the invention may also tie up processing power and shorten battery life. In step 608, the processor compares the behavior data to a predetermined threshold. For example, in an embodiment, the behavior data is behavior extracted from the user captured using a head-tracking sensor which extracts information about the user's head movement and duration of the head movement in a direction within a boundary associated with one or more portions of the content. When the user's head movement is directed to a boundary associated with at least a portion of the content, the threshold value that the head movement is maintained can be about 1 second, 2 seconds, 3 seconds, or 4 seconds. In another exemplary embodiment, the behavior data is behavior extracted from the user using an eye-tracking sensor which extracts information about the user's eye movement and duration of the users gaze within a boundary associated with one or more portions of the content. In this embodiment when the user's gaze is in a direction of a boundary associated with at least a portion of the content, the threshold value that the gaze is maintained can be about 500 ms, 1 second, 2 seconds, 3 seconds, 4 seconds or 5 seconds. In another embodiment, the predetermined threshold can be the image captured by the head-tracking sensor. For example, if the image capture of the head is a 100%, % of the face or ½ of the face the threshold value is met. In an exemplary embodiment, this predetermined threshold may be fixed and programmed into a mobile application. In another embodiment, the behavior data is acceleration data. For example, a smart phone that is dropped and bounces off the floor may detect an acceleration of approximately 2Gs along one or more axes. When a driver makes a sudden stop, as when she seeks to avoid a collision, the accelerometer in the smart phone she is carrying may register approximately 4Gs or more. Thus, in an exemplary embodiment, an acceleration threshold of 3G may be an appropriate threshold for determining whether the user of the smart phone has experienced an unusually strong or rapid acceleration or deceleration in an automobile. This threshold is intended to avoid false positives, which may be generated by random mishaps (e.g., dropping the smart phone) or which are not strong enough to indicate that the user has experienced or nearly avoided an serious incident in an automobile. In another embodiment, an acceleration threshold above 2G but below 2.5G may indicate the mobile device has been dropped but was not traveling in an automobile that experienced an unusually rapid deceleration. In another embodiment, not shown, the predetermined threshold value may be determined by the user's behavior data history. For example, the processor may record certain head images, head movements and/or eye movement sensed by the device over a period of time, and then prepare a statistical analysis to identify the range of images or movements values most commonly experienced by the device, and presumably by its user as well. The processor would use this range of values to determine the appropriate behavioral threshold. To avoid consuming excessive processing power, the application may be programmed to perform this type of analysis periodically, e.g., once a day, or week, or month, as appropriate. Step 608 proceeds to step 609.

In step 609, if the processor determines the behavior data is below the predetermined threshold, the process continues to step 601. If, however, the processor in step 609 determines the behavior data exceeds the predetermined threshold value, then the process proceeds to step 607.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What we claims is:

1. A computer-implemented method comprising:
   periodically monitoring, by a server via a GPS sensor in communication with an electronic device, a speed of the electronic device;
   when the speed of the electronic device satisfies a speed threshold, activating, by the server, a tracking sensor associated with the electronic device, the tracking sensor being configured to monitor behavior data of a user operating the electronic device;
   periodically retrieving, by the server via the activated tracking sensor, behavior data associated with the user;
   when the behavior data satisfies a behavior data threshold indicating that the user is facing a display of the electronic device and the speed of the electronic device satisfies the speed threshold:
      dynamically generating, by the server, modified electronic content data configured to be presented by the electronic device, the modified electronic content data corresponding to the electronic content data, and
      transmitting, by the server, the modified electronic content data to the electronic device;
   when at least one of the behavior data fails to satisfy the behavior data threshold and the speed associated with the electronic device fails to satisfy the speed threshold:
      resuming, by the server, presentation of the electronic content data on the electronic device.

2. The method of claim 1, wherein the electronic content data is at least one of an auditory content data or a visual content data.

3. The method of claim 1, wherein the behavior data comprises data corresponding to at least one of the user's eye gaze and head movement.

4. The method of claim 1, wherein the behavior data threshold corresponds to the user's head facing a display of the electronic device.

5. The method of claim 4, wherein the behavior data threshold corresponds to the user's head facing a display of the electronic device for a pre-determined time threshold.

6. The method according to claim 1, wherein the modified electronic content corresponds to at least one of pausing, stopping, and replacing presentation of the electronic content data.

7. The method according to claim 1, wherein the modified electronic content corresponds replacing the electronic content data with a blank display screen or a message on a display of the electronic device.

8. The method according to claim 1, further comprising at least one of reflecting a light on the user's face and offsetting an illumination source from a marker on the user's face.

9. A system comprising:
   an electronic device configured to present electronic content data;
   a GPS sensor in communication with the electronic device;
   a tracking sensor configured to monitor behavior data of a user operating the electronic device;
   a server in communication with the electronic device, the GPS sensor, and the tracking sensor, the server configured to:
      periodically monitor, via the GPS sensor, a speed of the electronic device;
      when the speed of the electronic device satisfies a speed threshold, activate the tracking sensor associated with the electronic device;
      periodically retrieve, via the activated tracking sensor, behavior data associated with the user;
      when the behavior data satisfies a behavior data threshold indicating that the user is facing a display of the electronic device and the speed of the electronic device satisfies the speed threshold:
         dynamically generate modified electronic content data configured to be presented by the electronic device, the electronic modified content data corresponding to the electronic content data, and
         transmit the electronic modified content data to the electronic device;
      when at least one of the behavior data fails to satisfy the behavior data threshold and the speed associated with the electronic device fails to satisfy the speed threshold:
         resume presentation of the content data to the electronic device.

10. The system of claim 9, wherein the electronic content data is at least one of an auditory content data or a visual content data.

11. The system of claim 9, wherein the behavior data comprises data corresponding to at least one of the user's eye gaze and head movement.

12. The system of claim 9, wherein the behavior data threshold corresponds to the user's head facing a display of the electronic device.

13. The system of claim 12, wherein the behavior data threshold corresponds to the user's head facing a display of the electronic device for a pre-determined time threshold.

14. The system according to claim 9, wherein the modified electronic content corresponds to at least one of pausing, stopping, and replacing the presentation of the electronic content data.

15. The system according to claim 9, wherein the modified electronic content corresponds replacing the electronic content data with a blank display screen or a message on a display of the electronic device.

16. The system according to claim 9, wherein the server is further configured to at least one of reflect a light on the user's face and offset an illumination source from a marker on the user's face.

17. A computer program product, stored on one or more non-transitory computer-readable devices, the program product configured to:
   transmit electronic content data configured to be presented by an electronic device;
   periodically monitor, via a GPS sensor in communication with the electronic device, a speed of the electronic device;
   when the speed of the electronic device satisfies a speed threshold, activate a tracking sensor associated with the electronic device, the tracking sensor being configured to monitor behavior data of a user operating the electronic device;
   periodically retrieve, via the activated tracking sensor, behavior data associated with the user;
   when the behavior data satisfies a behavior data threshold indicating that the user is facing a display of the electronic device and the speed of the electronic device satisfies the speed threshold:
      dynamically generate modified electronic content data configured to be presented by the electronic device, the modified content data corresponding to the electronic content data, and
      transmit the modified electronic content data to the electronic device;

when at least one of the behavior data fails to satisfy the behavior data threshold and the speed associated with the electronic device fails to satisfy the speed threshold: resume presenting the content data on the electronic device.

18. The program product of claim 17, wherein the electronic content data is at least one of an auditory content data or a visual content data.

19. The program product of claim 17, wherein the behavior data comprises data corresponding to at least one of the user's eye gaze and head movement.

20. The program product of claim 17, wherein the behavior data threshold corresponds to the user's head facing a display of the electronic device.

* * * * *